(12) United States Patent
Marsh et al.

(10) Patent No.: US 6,208,799 B1
(45) Date of Patent: Mar. 27, 2001

(54) VCR RECORDING TIMESLOT ADJUSTMENT

(75) Inventors: Richard Marsh, Burbank; Joe Edmonds, Los Angeles; Haig Krakirian, Glendale; Michael Leonard La Joie, Sherman Oaks, all of CA (US)

(73) Assignee: Time Warner Entertainment Company L.P., Stamford, CT (US)

( * ) Notice: Subject to any disclaimer, the term of this patent is extended or adjusted under 35 U.S.C. 154(b) by 0 days.

(21) Appl. No.: 08/841,262

(22) Filed: Apr. 29, 1997

(51) Int. Cl.[7] ........................................ H04N 5/91
(52) U.S. Cl. .................. 386/83; 348/906; 725/32; 725/140
(58) Field of Search ...................... 386/83; 348/12, 348/13, 731, 732, 734, 906; 455/5.1, 185.1, 186.1

(56) References Cited

U.S. PATENT DOCUMENTS

| | | |
|---|---|---|
| 5,361,091 | 11/1994 | Hoarty et al. |
| 5,412,720 | 5/1995 | Hoarty. |
| 5,552,833 * | 9/1996 | Henmi et al. ................... 348/906 |
| 5,822,123 * | 10/1998 | Davis et al. ..................... 348/906 |
| 5,880,768 * | 3/1999 | Lemmons et al. ............... 348/906 |

\* cited by examiner

Primary Examiner—Wendy Garber
Assistant Examiner—Christopher Onuaku
(74) Attorney, Agent, or Firm—F. A. Sirr; Holland & Hart LLP (57) ABSTRACT

A TV cable system having one set-top per user. The set-top's VCR recording functions are automatically adjusted in a manner to accommodate the occurrence of a program-delay event or a program-cancel event by the TV cable system. The expected begin/stop time-slot during which a program is projected to occur is broadcast by the system's head end to each set-top, and this IPG data is stored in each set-top. Within each set-top, the currently stored IPG-data is periodically compared to IPG-data that was recorded in the set-top's VCR-record-timers at an earlier time. When the recorded IPG-data does not compare to the current IPG-data, the IPG-data that is recorded in the VCR-record-timer is automatically updated to the current IPG-data. When this automatic updating of one VCR-record-timer produces a time-slot conflict with a different VCR-record-timer, the conflict is resolved, either automatically or by a user-alert-message that enables user intervention to resolve the conflict.

6 Claims, 10 Drawing Sheets

VCR RECORDING TIMESLOT ADJUSTMENT

BACKGROUND OF THE INVENTION

1. Field of the Invention

This invention relates to interactive multimedia communication networks, such as interactive TV cable systems, that send both broadcast and on-demand features to a number of subscribers, wherein each subscriber's location includes a set-top terminal and a television (TV) set that is connected to the set-top terminal, and wherein each subscriber's location may also include a Video Cassette Recorder (VCR) that is connected to the set-top terminal.

2. Description of the Related Art

On demand, interactive, television (ITV) systems are known in the art. U.S. Pat. No. 5,412,720 to Hoarty and U.S. Pat. No. 5,361,091 to Hoarty et al, incorporated herein by reference, are examples.

Applications currently exist for cable TV set-tops which allow the subscriber to program the set-top in a manner to cause its local VCR to record a particular TV program based upon Interactive-Program-Guide (IPG) information that is provided to the subscriber.

More specifically, it is conventional for the ITV system's headend to periodically broadcast IPG information or data for storage in erasable-memory that is within each of the set-tops that exist within the ITV system. For example, the headend may broadcast the 12 AM to 12 PM schedule for a particular date/month that falls on a Wednesday.

The set-tops are programmed, or controlled, to maintain this IPG data in memory during this date/month, while periodically discarding the out-of-time IPG material as time continues to pass throughout the day, perhaps keeping the last hours worth of old data.

For example, the set-top's locally-stored IPG data contains one-day, seven-days, or perhaps fourteen-days, of the programming that is available on all channels that are within the ITV system, both broadcast programming and on-demand programming. In addition, it is conventional that as the program-content that is contained within this one, seven or fourteen-day period changes, the headend sends an IPG-data-update for local set-top storage, replacing the out-of-date and prior-stored IPG data for this particular one, seven or fourteen-day interval.

Individual subscribers, or users, may call-up or retrieve this locally stored IPG data for display on the screen of their local TV set. This visual display usually comprises a horizontal/vertical matrix of individual program boxes, wherein each program box contains program information relating to one individual TV program. Within this IPG graphic TV display, an upper and horizontally extending boarder contains time-slot interval information wherein time intervals progress to the right of the display. This time-slot information is usually shown in half-hour increments. The downward extending and left-hand boarder of this IPG graphic display contains the individual TV channel identification of the cable TV system.

This general type of IPG data display is well known to those of skill in the art. For example, one day TV programming data of this type is normally contained in daily newspapers.

A manual-control-means is provided whereby a user can scroll in both a horizontal and a vertical direction through the TV display of the one, seven or fourteen day period, as is desired by the user.

With this IPG data visually displayed on the TV screen, the user may manually position a cursor or the like in order to select the program box of one present-time program for present-time viewing on the TV set.

In addition, the user can cursor-select one program box of a future-time program, thus enabling the future-time VCR recording, thus enabling a more future-time TV viewing of that particular program. Usually, each set-top is provided with eight VCR-record-timers, to thereby enable up to eight future-time programs to be selected for VCR recording.

A manual-control-means is also provided that enables a user to display the content of all eight VCR-record-timers on the user's local TV screen. When so displayed, the user can cancel or change the content of any particular VCR-record-timer, as desired.

User-alert-messages are provided by a set-top for current-time or future-time display on the user's TV screen. For example, should the user attempt to program a ninth future-time program for VCR recording, a user-alert-message is displayed on the user's TV screen. The user may then cancel a prior programmed VCR-record-timer, or the user can abort the attempt to program this ninth future-time program.

An example of a single program IPG data entry that is displayed on the user's TV screen may be a form of the following; "2701, Roseanne, channel 5, 8 to 9 pm". The "Roseanne" and "2701" portions of this IPG data is contained within a cursor-selectable program box on the TV screen. The "channel 5" portion of this IPG data is provided by virtue of the fact that the cursor is positioning on the horizontally extending channel identifier for channel 5. The "8 to 9 PM" portion of this IPG data entry is provided by virtue of the fact that the cursor is positioning on the vertically extending time interval identifier for the 8 to 9 PM time period.

The above-noted item "2701" is not only a generic program identifier for all episodes of the serialized program "Roseanne", but in addition, this identifier "2701" can be modified to contain information as to the specific episode of the program "Roseanne" that is to be broadcast on channel 5 in the 8 PM to 9 PM time interval. For example, such an identifier may be in the form "2701.23".

In order to program one of the set-tops VCR-record-timers to contain the entry "Roseanne, channel 5, Wednesday, 8 to 9 PM", the user merely presses a control button associated with the cursor as the cursor is positioned at the corresponding program box.

Within this IPG data TV display, the item "2701" (in its binary equivalent) also serves to identifies the remaining content of the IPG data entry. Thus, the user can also program the VCR to record this program by entering the four numbers "2710" by way of the user's IR remote control. This four-number entry operation will also operate to program of one of the set-tops VCR-record-timers to contain the entry "Roseanne, channel 5, Wednesday, 8 to 9 PM".

When the Wednesday 8 PM time-to-record arrives, the set-top is automatically controlled to present channel 5 as an input to both the associated VCR and the associated TV. The set-top also automatically communicates a begin-recording message to the VCR, for example by using an infra-red (IR) VCR remote control emulating device, sometimes called a VCR blaster. In this manner, VCR recording of the desired program "Roseanne", having program number "2701", begins. One hour later, when the time 9 PM arrives, the set-top is controlled to automatically communicate a stop-recording message to the VCR.

In some instances, the requested program "2701, Roseanne" is delayed, or the requested program "2701, Roseanne" is cancelled. In these situations the future-time recording request to record this program should either be moved to a new time-slot, or the request-to-record should be cancelled.

The above described format for IPG data is not critical to this invention. More generally, program-data of this type comprises a number of individual data-items. Each data-item operates to identify one individual TV program, the channel on which the program will be broadcast, the time-slot during which the program will be broadcast, and the date/day on which the program will be broadcast.

A need remains in the art whereby the occurrence of a program-delay event, or a program-cancel event, results in automatically changing a future-time recording request to contain the new and correct channel, and/or day, and/or time-slot, or alternatively results in an automatic cancellation of this particular future-time recording request.

SUMMARY OF THE INVENTION

The present invention provides an apparatus/method that automatically adjusts the VCR recording function of a set-top in a manner to accommodate the occurrence of a program-delay event or a program-cancel event.

In accordance with the present invention, a cable system subscriber supplies IPG-program-information to the set-top when future-time VCR recording of the program is requested by the subscriber. For example, this information may be the above-mentioned program number "2701", or this information may be the identifier "Roseanne".

This IPG-program-information operates along with the above described IPG data to identify the program's name, the channel, the date, and the expected begin/stop time-slot during which the program is projected to be broadcast by the set-top's currently stored IPG data.

Based upon the above-mentioned sample recording request "Roseanne, channel 5, Wednesday, 8 to 9 PM", the set-top uses a heuristic apparatus/method to cause the VCR to automatically record a program that most nearly fits the description "Roseanne, channel 5, Wednesday, 8 to 9 PM", i.e. the set-top does not control the VCR to rigidly record whatever program is being broadcast on channel 5 on Wednesday from 8 to 9 PM.

As an additional feature of the invention, data compression techniques are used to implement the invention.

In accordance with this invention, each time an IPG data update is received by a set-top from the cable system's headend, this updated IPG data replaces the prior-stored IPG data within the set-top. All future-time VCR recording events, that is the content of all VCR-record-timers that-exist in the set-top's memory, are then checked against this newly stored IPG data. If a discrepancy is found between the set-top's VCR-record-timer data and this new IPG data, for example if the channel and/or time-slot specified by the VCR-record-timer do not map to the program name and/or to the program number this is contained in the new IPG data, an adjustment or change is made to the related VCR-record-timer to thereby cause the VCR-record-timer to exactly correspond to the new IPG data.

Thus, if the program "Roseanne", having the program number "2701", no longer appears in the new IPG data at the entry "Wednesday, channel 5, 8 to 9 PM", the set-top operates to search the new IPG data for another program that has the same name "Roseanne", or the set-top operates to find a program having the program number "2701".

If such a program is found within the new IPG data, at a different date, and/or channel, and/or time-slot, the related VCR-record-timer is automatically changed such that the requested program "Roseanne" or program number "2701" will be recorded by the VCR at this new date, and/or channel, and/or time-slot.

As a feature of the invention, a future-time VCR recording request such as "2710, Roseanne, channel 5, Wednesday, 8 to 9 PM" may include an additional parameter such as episode description information or an episode number, thereby facilitating the selective recording of one serialized program episode. This feature of the invention enables a user to discriminate between the recording of particular episodes of a particular program such as "Roseanne", or of a "soap opera".

In addition, it may be desirable to save Non Volatile Random Access Memory (NVRAM) space at the set-top by storing this extended program information, for example the episode description information, at the cable system's headend. As will be appreciated, this will operate to move a portion of the heuristic logic function from each set-top to the cable system's headend.

These and other objects, functions and advantages of the present invention will be apparent to those of skill in the art upon reference to the following detailed description, which description makes reference to the drawing.

DESCRIPTION OF THE PREFERRED EMBODIMENT

Figure 1:
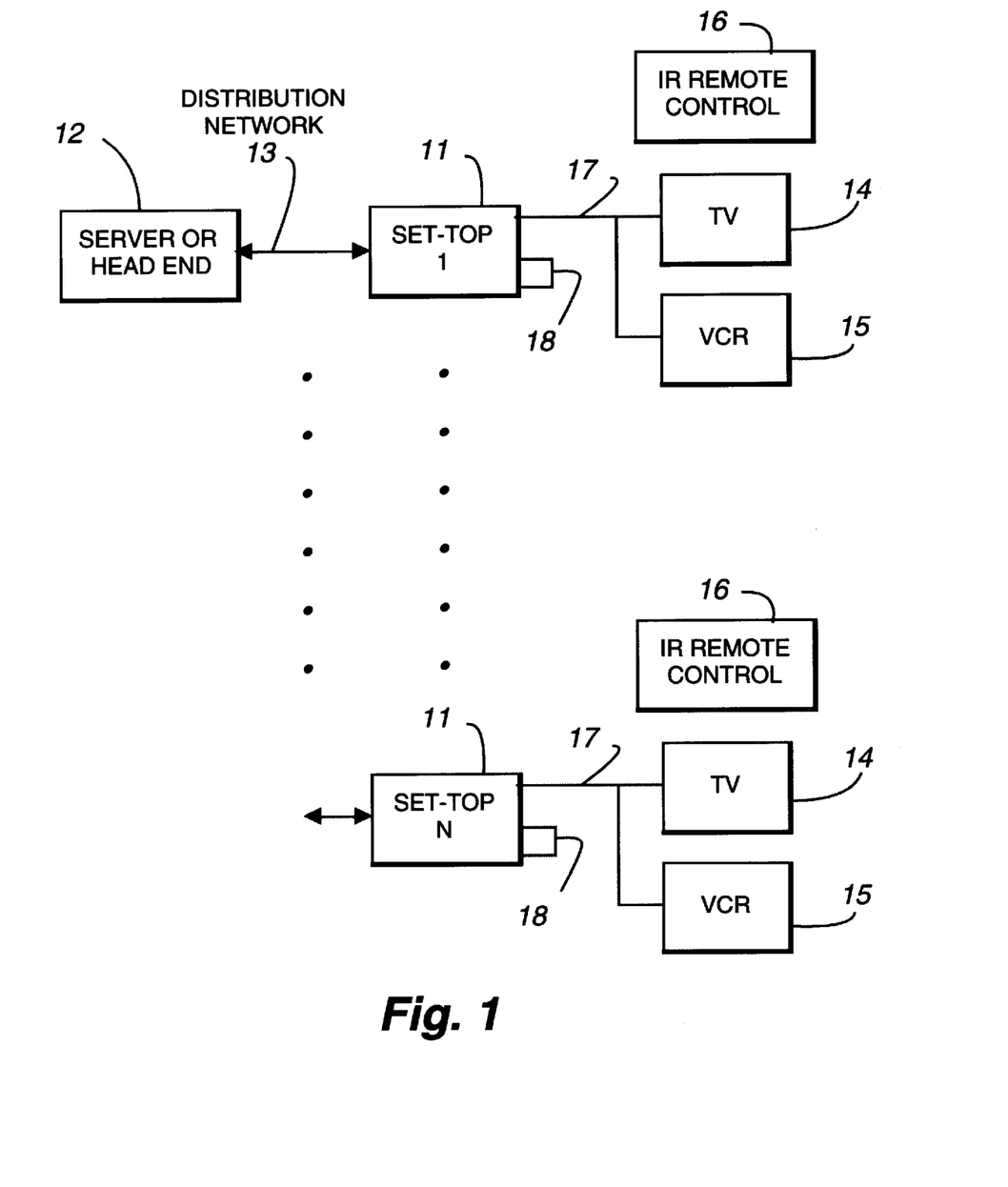
FIG. 1 is a showing of an interactive TV network that incorporates the number N of set-tops in accordance with the present invention.

FIG. 1 shows an interactive TV network 10 that incorporates the number N of individual set-tops 11, wherein each set-top 11 incorporates the present invention. This network showing is of a very general and simplified form. Such a network 10 includes a system headend or server 12 that provides services to the N subscribers or users that a within network 10.

While it is possible that any individual user could have more than one set-top 11 installed at the user's physical location or home, FIG. 1 assumes that each user has only one set-top 11 connected to the system's headend 12 by way of a two-way distribution network 13. The details of construction and arrangement of the system's headend 12 and analog/digital distribution network 11 are not critical to this invention and will not be described in detail herein.

Each set-top 11, in accordance with this invention, has one TV set 14 and one VCR 15 connected to that user's set-top 11. As is well known, each set-top 11 operates to connect one presently-selected, or one prior-selected, headend channel to TV 14 and/or VCR 15 by way of distribution network 11. For example, any given set-top 11 may operate to connect the headend's channel 5 to both its TV 14 and its VCR 15 by way of a cable 17. As is conventional, a set-top 11 transmits all system channels by way of a channel-3 or channel-4 output on cable 17, and all TVs 14 and VCRs 15 are constructed and arranged to receive on channel-3 or on channel-4.

In addition, each of the N user is provided with a manually-operable infra-red (IR) remote control(s) 16 that enables a user to communicate with that user's user-top 16 and with that user's VCR 15.

As stated above, channel picture signals, as well as other visual data, that is to be visually presented to a user on the screen of a TV 14, and/or that is to be recorded by operation of a VCR 15, is contained on the output connection or cable 17 that is connected to the output of each set-top 11. In addition, each set-top 11 is provided with an IR control unit 18, or VCR blaster 18, by which a set-top 11 automatically controls the various functions of its associated VCR 15.

The present invention relates to apparatus/logic/methods that are structurally and functionally resident within each of the set-tops 11, and that enables each set-top 11 to periodically interrogate its stored VCR-record-requests for future-time VCR recording events, in order to determine if and when a change in the cable system's program schedule has rendered such a future-time VCR-record-event invalid.

When an invalid future-time VCR-record-event is detected by the set-top's apparatus/logic/methods, (1) the invalid future-time VCR-record-event is automatically rescheduled to the correct date/time/channel as is defined within new IPG data that has been transmitted by headend 12 and stored by set-tops 11, or (2) the invalid future-time VCR-record-event is periodically monitored to determine if new IPG data thereafter received from the headend now enables automatic rescheduling to the correct date/time/channel, noting that this reschedule must take place prior to arrival of the incorrect date/time, or (3) if correct rescheduling is not possible when the incorrect date/time finally arrives, the invalid future-time VCR-record-event is cancelled.

Figure 2:
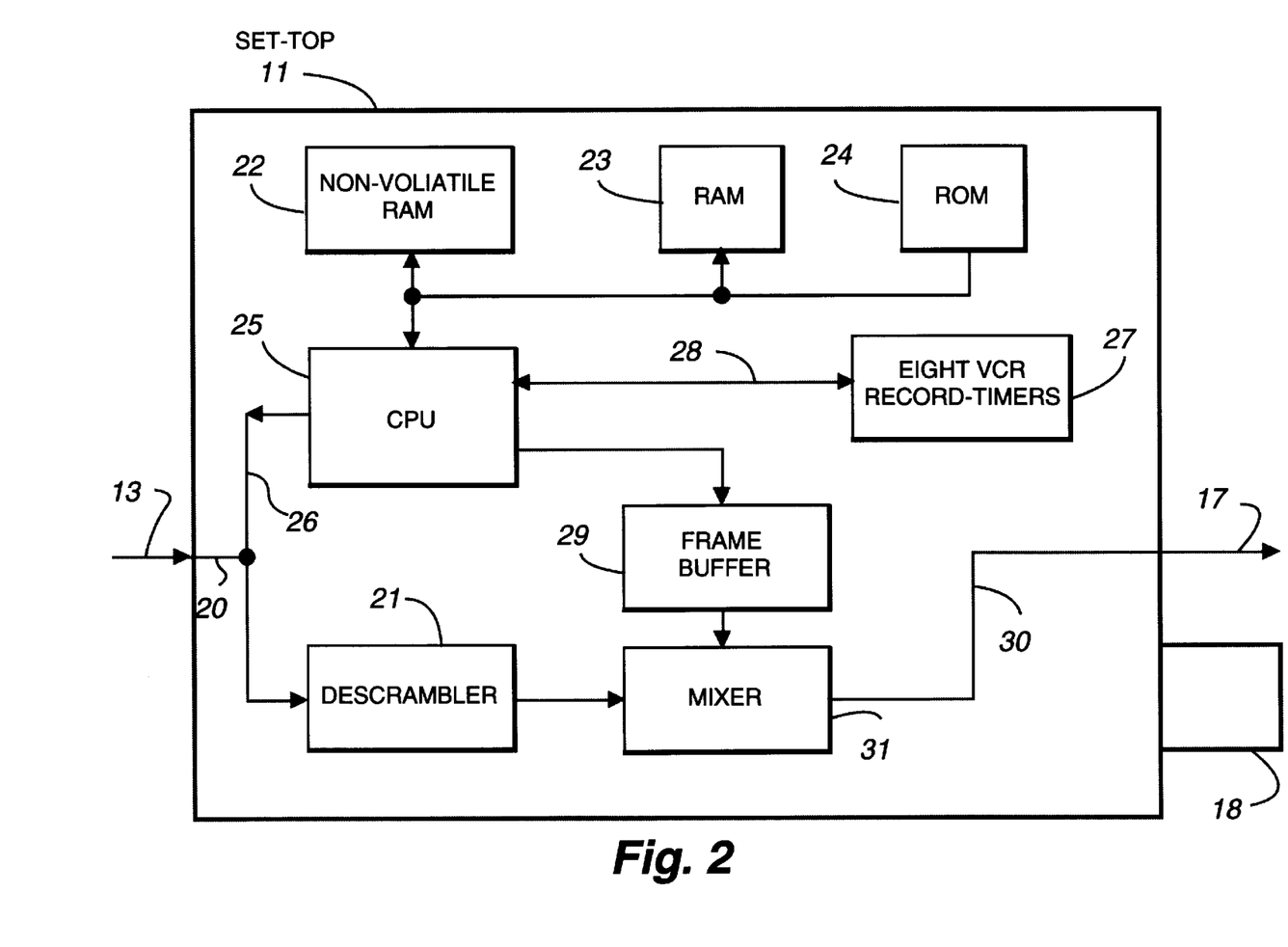
FIG. 2 shows one of the set-tops of FIG. 1 in greater detail.

FIG. 2 shows a set-top 11 of FIG. 1 in somewhat greater detail, but again this showing is only a simplified form from which the present invention will be apparent to those of skill in the related art.

The input 20, or input bus 20 within a set-top 11, connects to FIG. 1's distribution network 13. The signal characteristic that is presented to the input 20 of each set-top 11 by distribution network 13 is not critical to this invention. By way of example, set-top input 20 may comprise analog signals, and/or Quadrature Amplitude Modulated (QAM) signals, and/or Quadrature Phase Shift Key modulated (QPSK) signals. In addition, set-top input 20 includes non-picture data information, such as IPG data, that may be carried within the vertical blanking interval (VBI) of a TV picture transmission.

Where an on-demand and extra cost program is transmitted by headend 12, for viewing only by authorized users, a set-top descrambler 21 is enabled to descramble the on-demand feature.

Set-top 11 includes a number of memory elements, including a read/write nonvolatile RAM (NVRAM) 22, a read/write random access memory (RAM) 23, and a read only memory (ROM) 24. These memory elements 22,23,24 cooperate with a central processing unit (CPU) 25. The above described IPG data is stored within one or more of the memory elements 22,23,24.

Apparatus/logic/methods to implement the present invention generally comprises logic functions that are preferably stored as programming within the above-mentioned set-top memory 22,23,24, for example in RAM 23. However, it should be noted that discrete logic circuits, such as application-specific integrated circuits, can be provided as the full equivalent of such memory-stored programming for controlling the operation of CPU 25.

By way of example, and not by way of limitation, when IPG data is received at input 20, this IPG data is supplied to CPU 25 by way of bus 26. CPU 25 then operates to store this IPG data within a segment of memory that is designated to contain IPG data. Later, when the next day's IPG data is received at input 20, or when an IPG data update is received at input 20, CPU 25 operates to store this new IPG data, as the old IPG data is overwritten.

Reference numeral 27 identifies the above-mentioned eight individual VCR-record-timers 27 that communicate with CPU 25 by way of bus 28. As stated above, a common feature of a set-top 11 is that upon user request, the stored content of timers 27 can be displayed on the screen of the user's TV 14 as a full-screen output. When such a request is made by the user, the content of timers 27 is fetched by CPU 25, and this VCR-record-timer data is placed within frame buffer 29. Frame buffer 29 presents this data to set-top output 30 by way of a mixer 31.

In addition, upon an appropriate user command or request being supplied to CPU 25, CPU 25 operates to fetch the set-top's stored IPG data, and this IPG data is presented to frame buffer 29 for full-screen TV visual presentation to the user.

These are but two uses of mixer 3 1. Another use of mixer 31 is to overlay a less than full screen user-alert message on top of a picture that is currently being transmitted by the headend. For example, assume that certain ones, but not all, of the VCR-record-timers 27 have been set with future-time recording requests, and that the user now attempts to enter yet another future-time record request into an empty VCR-record-timer 27. In the event that this present attempt involves a program that presents a time-slot conflict, for example the present attempt is for a Wednesday 8:30 to 9 PM time-slot, and one of the VCR-record-timers contains a prior request for Wednesday 8 to 9 PM, then this time-slot conflict invokes a user-alert message that is sent to the user's TV screen by way of mixer 31.

Figure 3:
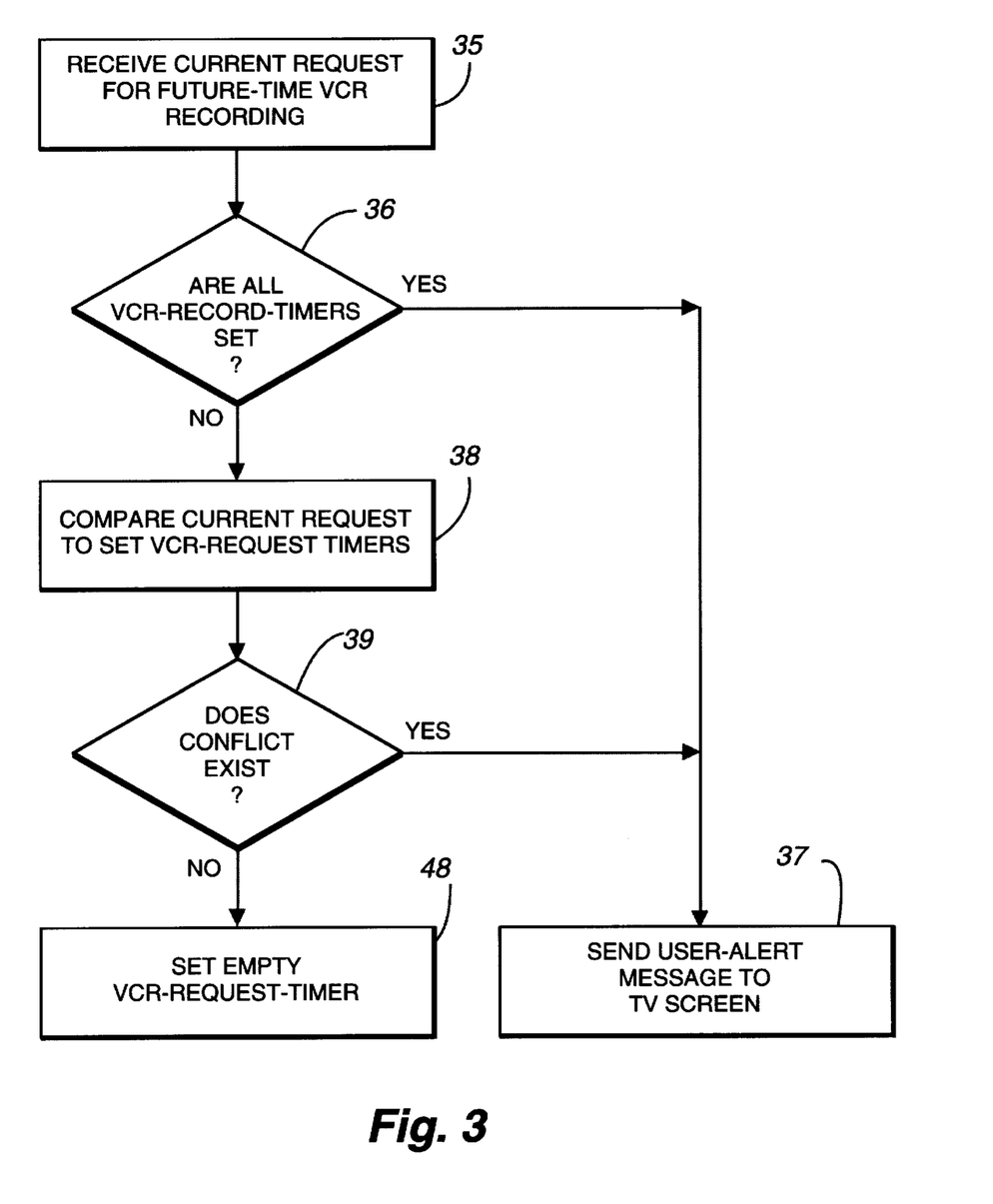
FIG. 3 is an apparatus/logic/programming flowchart that shows the present invention providing resolution of a time-slot conflict when a future-time VCR record request is received by the set-top CPU of FIG. 2.

FIG. 3 is a flowchart showing of a portion of the present invention as it involves the resolution of a time-slot conflict.

At event 35 of FIG. 3, a present-request by the user for the future-time recording of a program that is selected from the IPG data that is stored in the memory 22,23,24 of FIG. 2 is received by the set-top's CPU 25. As pointed out above, this present-request for VCR recording may be received by a set-top 11 by way of the user's remote control 16, in a manner that is not critical to the present invention.

In accordance with this invention, the request of event 35 is in the form "2701, Roseanne, channel 5, Wednesday, 8 to 9 PM", as discussed above. Prior to entering the current-request IPG data of event 35 into one of FIG. 2's VCR-record-timers 27, request conflicts must be investigated.

At decision function 36, CPU 25 determines if all VCR-record-timers 27 are in use; i.e., do all eight VCR-record-timers 27 contain request data? If the answer is "yes", then function 37 sends a user-alert message to the user's TV screen. The form of this message, and the action possibilities that are then provided to the user, are not critical to the invention. It suffices to say that the user can abort request 35, or the user can cancel a prior-set VCR-records-timer 27 and then cause request 35 to be entered in that particular VCR-record-timer 27.

When one or more VCR-record-timers 27 are empty of IPG data, function 38 operates to compare the day/time details of current request 35 to the day/time content of the set VCR-record-timers 27.

Decision function 39 now enables CPU 25 to determine if function 38 has found a day/time conflict. When the answer is "yes", again a user-alert 37 is sent to the user's TV screen, the details of this message being non-critical to the invention. The action that is possible by the user includes cancellation of one of the conflicting VCR recording requests.

When no conflict is found during the course of functions 38,39, function 40 operates to set the IPG data "2701, Roseanne, channel 5, Wednesday, 8 to 9 PM" into an empty one of the eight VCR-record-timers 27.

Figure 4:
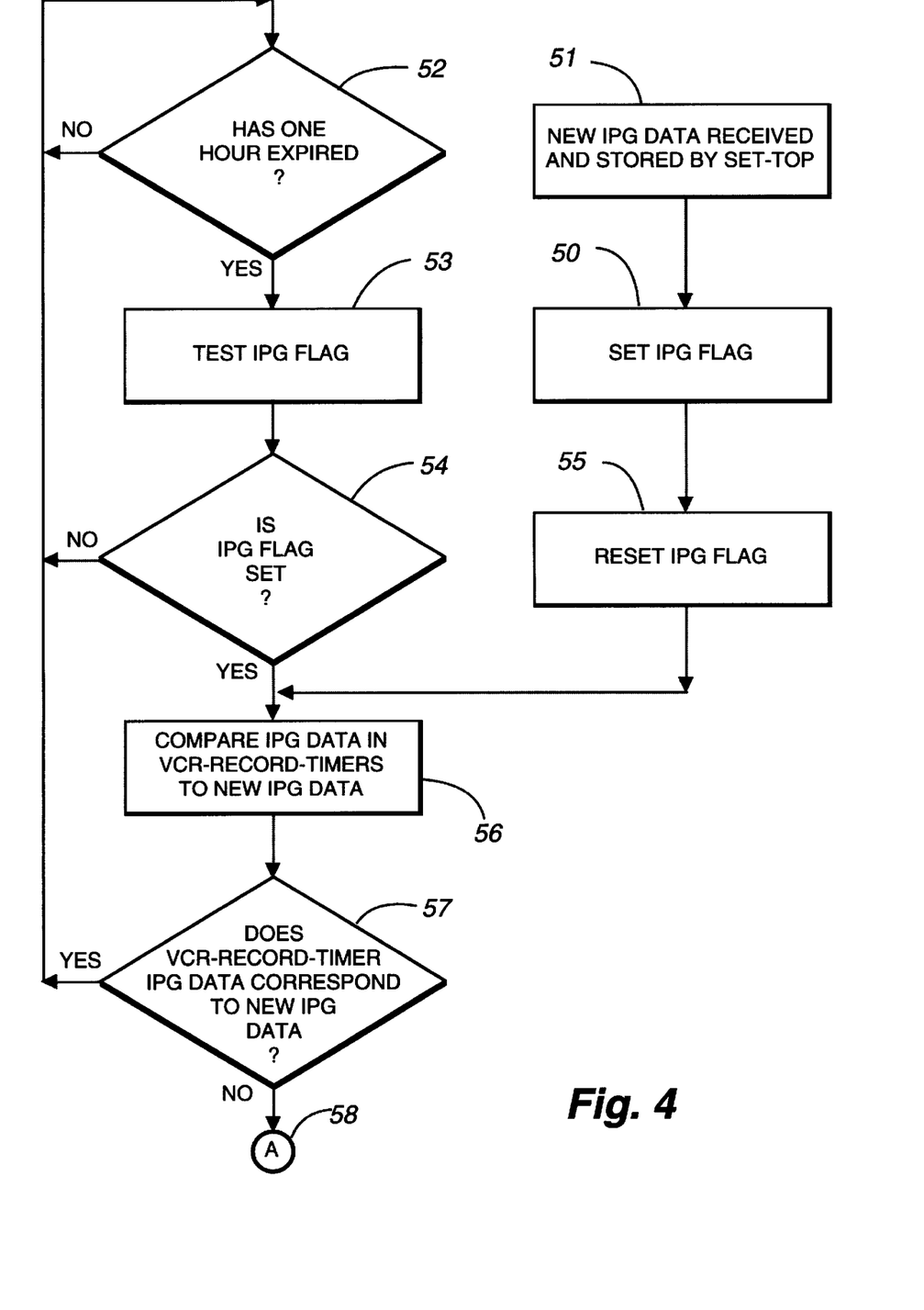
FIG. 4 is an apparatus/logic/programming flowchart that shows the present invention operating in a repeating cycle to check the VCR-records-timers when the set-top receives new IPG data from the head end, wherein the new IPG data contains data that is identical to the IPG data that was stored in a set-top VCR-record-timer at an earlier time.

FIG. 4 shows how CPU 25 within a set-top 11 operates in a repeating and cyclic basis to monitor for the reception of new IPG data 51 from head end 12. More specifically, the operation of FIG. 4 relates to the situation wherein the new IPG data 51 does not differ from the IPG data that is recorded in VCR-record-timers 27.

In FIG. 4, function 51 shows a set-top 11 receiving new IPG data from the cable system's headend 12. When event 51 occurs, an IPG flag is set, as indicated at 50.

As stated, this new IPG data 51 contains at least some individual data items that are different than the IPG data that was stored in set-top memory 22,23,24 at an earlier time. However, this new IPG data 51 may, or may not, contain IPG data that is different than the IPG data contained in the active ones of VCR-record-timers 27.

For example, the new IPG data 51 may comprise the replacement of Tuesday's IPG data with Wednesday's IPG data, or this new IPG data 51 may comprise the replacement of an earlier-transmitted Wednesday IPG data transmission with Wednesday IPG data that is in some respect different than the earlier-transmitted Wednesday IPG data.

In the FIG. 4 process, one controlling event is the setting of IPG flag 50 by function 50. This IPG flag 50 is set whenever new IPG data 51 is received by set-tops 11 from headend 12, which new IPG data 51 is then stored in memory 22,23,24 within each set-top 11. This new IPG data receiving event is indicated in FIG. 4 by function 51.

A second controlling event of the FIG. 4 process is event 52 that produces the once-per-hour repeating and cyclic operation of FIG. 4. Event 52 is essentially a timer that times-out at the end of a given time period, in this case one hour. Thus, once each hour a "yes" output from decision function 52 enables testing or interrogating the state of IPG flag 50 by function 53.

Decision function 54 determines if IPG flag 50 was found to be in a set state by test function 53. A "no" output from decision function 54 causes the FIG. 4 process to return to decision function 52 to await the expiration of another one hour time period.

When, however, decision function 54 finds that IPG flag 50 is in a set state, the "yes" output of decision function 54 operates to (1) reset IPG flag 50 by way of function 55, and (2) enable function 56 to compare the IPG data content of all active VCR-record-timers 27, i.e. all timers 27 that contain IPG data, to the new IPG data 51 that was stored in set-top memory 22,23,24 sometime during the prior one hour time period that was measured by function 52.

Of course, any requests for a future-time VCR recording that were received by the set-top after event 51 set IPG flag 50 will present no problem because the new IPG data 51 is the IPG data that was used during the process of making such future-time VCR recording requests.

As for future-time VCR recording requests that were received before the event 51 that set IPG flag 50, these particular VCR recording requests will present a problem only when the new IPG data 51 is different than corresponding VCR recording request data that is stored within one of the active VCR-record-timers 27.

Decision function 57 operates to compare (1) the IPG data content of all active or set VCR-record-timers 27, and (2) the new IPG data 51 that was received and then stored within set-top memory 22,23,24.

When the corresponding portion of the new IPG data 51 does not differ from the IPG data that is recorded in any one of the active VCR-record-timers 27, then the "yes" output of decision function 57 returns the FIG. 4 process to decision function 52 to await the expiration of a one hour time period.

Figure 5:
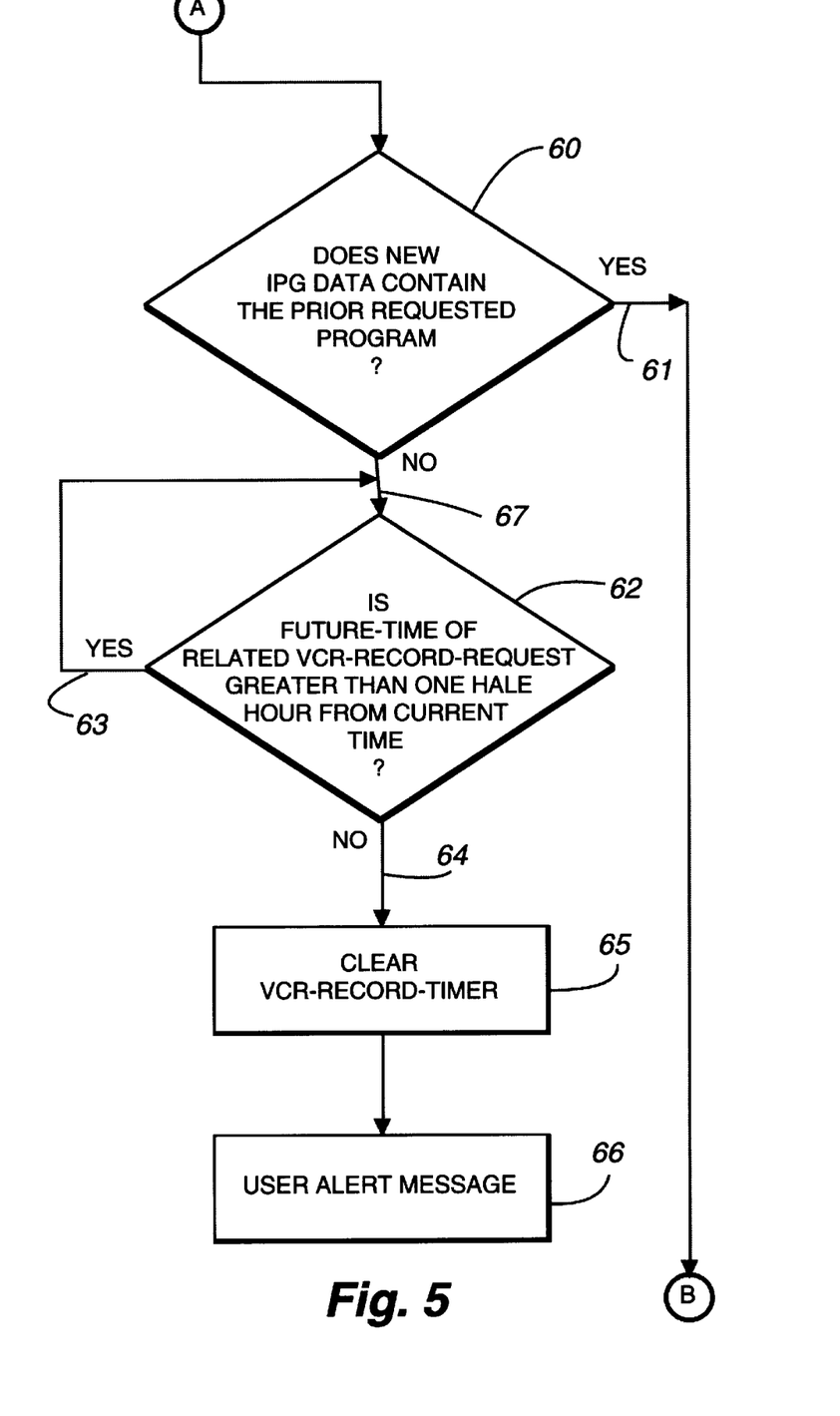
FIG. 5 is an apparatus/logic/programming flowchart that shows the present invention operating in a repeating cyclic basis to check for the later arrival of necessary IPG data when the set-top receives new IPG data from the head end, when this new IPG data is discovered to be different than the IPG data that was stored in a set-top VCR-record-timer at an earlier time, when this new IPG data does not contain the necessary IPG data, and when the later received IPG data also does not supply the necessary IPG data.

When, however, the "no" output of decision function 57 indicates that the corresponding portion new IPG data 51 differs from the IPG data that is recorded in one or more of the VCR-record-timers 27, then the FIG. 4 process exits to FIG. 5 by way of event 58.

When a correspondence is not found by decision function 57, and the "no" output 58 results, three possibilities exist. Namely, (1) new IPG data 51 contains no individual IPG data item that can be used as a substitute for the now-incorrect IPG data that is contained in an active VCR-record-timer 27, or (2) new IPG data 51 does in fact contain an IPG data item that can be used as a substitute, but use of this IPG data item will produce a time-slot conflict with another active VCR-record-timer 27, or (3) new IPG data 51 does in fact contain an IPG data item that can be used as a substitute, and use of this IPG data item will not produce a time-slot conflict with another active VCR-record-timer 27.

FIG. 5 shows a mode of operation of the invention when FIG. 4's decision function 57 of FIG. 4 determines that the IPG data found within an active one of the VCR-record-timers 27 was not found within the newly received IPG data 51.

More specifically, FIG. 5 shows how the apparatus/logic/programming of a set-top CPU 25 operates on a repeating cyclic basis when a set-top 11 receives new IPG data 51 from headend 12 that is different than the IPG data that is stored in an active VCR-record-timer 27, wherein this different IPG data does not contain any IPG item that can be used to reprogram the VCR-record-timer 27, and wherein yet later received IPG data 51 still does not supply the necessary IPG data to reprogram the VCR-record-timer 27.

More specifically, decision function 60 of FIG. 5 operates to determine whether or not any portion of new IPG data 51 corresponds to the now-incorrect IPG data that was found by function 56 stored within one of the active VCR-record-timers 27.

An example of the finding of such corresponding IPG data, and a resulting "yes" output 61 from decision function 60, is when a given VCR-record-timer 27 contains the now-incorrect IPG data content "2701, Roseanne, Wednesday, 8 to 9 PM", whereas one portion of the newly received IPG data 51 contains the corresponding entry "2701, Roseanne, Wednesday, 9 to 10 PM".

Figure 6:
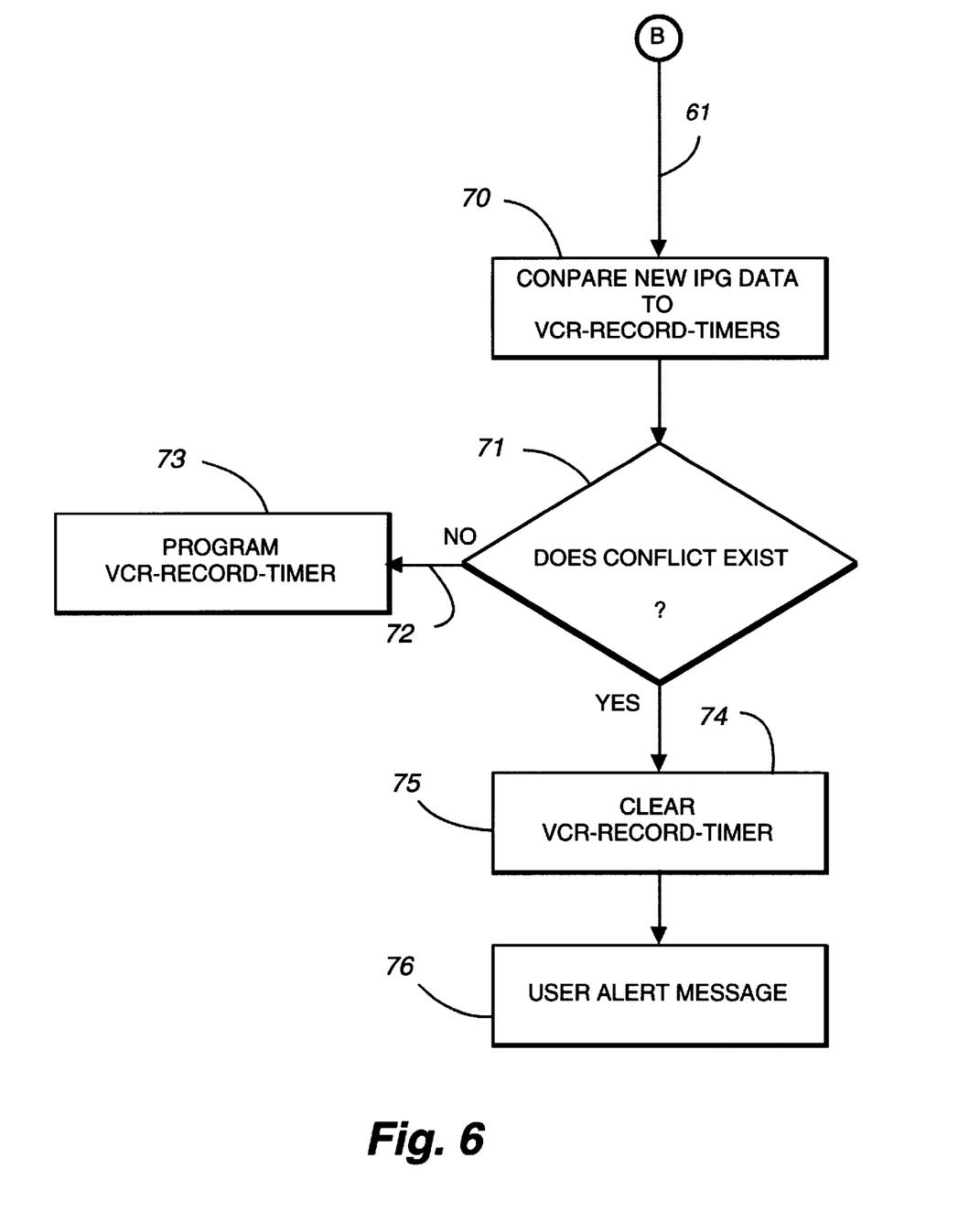
FIG. 6 is an apparatus/logic/programming flowchart showing of the present invention when the set-top receives new IPG data from the head end that is different than the IPG data that was stored in a set-top VCR-records-timer at an earlier time, showing use of this new IPG data to reprogram the related VCR-record-timer when this use does not result in a time-slot conflict, and showing the clearing of the related VCR-record-timer and generation of a user-alert message when use of this new IPG data would result in a time-slot conflict.

When this "yes" situation is discovered, as shown by output 61 of decision function 60, the process of FIG. 5 exits to FIG. 6 in order to determine if use of this new IPG data 51 to reprogram the related VCR-records-timer 27 will result in a time-slot conflict with any other VCR-record-timer 27.

When a "no" situation is discovered by decision function 60, as shown by "no" output 67, it may still be possible to recover and provide for proper VCR recording, even though the current new IPG data 51 does not provide the necessary program information. More specifically, the present invention enables a waiting period during which all yet newer IPG data 51 is monitored to see if this yet newer IPG data contains the required program information.

More specifically, "no" output 67 from decision function 60 enables decision function 62 to determine if the time-slot that is specified within that now-incorrect IPG data that is recorded within the active VCR-record-timer 27 specifies a start-time that is more than one-half hour ahead of the current time, that is, more that one-half hour ahead of the time of operation of decision function 60.

A "yes" output 63 from decision function 62 indicates the possibility that later occurring new IPG data 51 may contain the necessary IPG data, thus enabling a "yes" output 61 from decision function 60.

Therefore, "yes" output 63 causes decision function 62 to cycle, perhaps with a short time delay, awaiting either (1) the detection of the necessary reprogramming IPG data, where-upon this cycling stops as a result of a "yes" output 61 from decision function 60, or (2) a future time at which the now-incorrect IPG data recorded within the active VCR-record-timer 27 specifies a start-time that is shorter than one-half hour ahead of the current time, in which case "no" 64 output of decision function 62 is enabled.

The presence of a "no" output 64 from decision function 62 indicates that it is no longer possible to reprogram this particular active VCR-records-timer 27 that contains the incorrect IPG data. Therefore, function 65 is enabled to clear or render inactive that particular VCR-record-timer 27, and function 66 provides a related user-alert message for current-time or for future-time TV viewing by the user.

FIG. 6 is an apparatus/logic/programming flowchart showing of the present invention when a set-top 11 receives new IPG data 51 from head end 12, when this new IPG data 51 is discovered to be different than the IPG data that is stored in an active VCR-record-timer 27. FIG. 6 shows both (1) a use of this new IPG data 27 to reset or reprogram the VCR-record-timer 27 when this use of the new IPG data 51 does not result in a time-slot conflict, and (2) generation of a user-alert message when use of this new IPG data 51 would result in a time-slot conflict with another VCR-record-timer 27.

At output 61 of FIG. 5 it was determined that the new IPG data 51 contained an IPG data item that could be used to properly reprogram an active but inaccurate VCR-record-timer 27. This information is supplied as an input to compare function 70 of FIG. 6. Compare function 70 operates to compare the usable IPG data item within new IPG data 51 to the IPG data that is recorded in all other active VCR-record-timers 27.

Decision function 71 now operates to determine if a conflict exists between the usable IPG data item that is within new IPG data 51 to the IPG data that is recorded in all other active VCR-record-timers 27. A "no" output 72 enables function 73 to reprogram the related VCR-record-timer 27, using this usable IPG data item.

A "yes" output from decision function 71 enables function 75 to clear the related VCR-record-timer, and enables function 76 to generate a user-alert message for current-time or for future-time viewing by the set-top user.

It is contemplated by the present invention that other priority schemes may be used in place of function 75. For example, the conflict detected by functions 70,71 can be resolved by clearing the conflicting VCR-record-timer whose record time that is the most distant from the current time.

Figure 7:
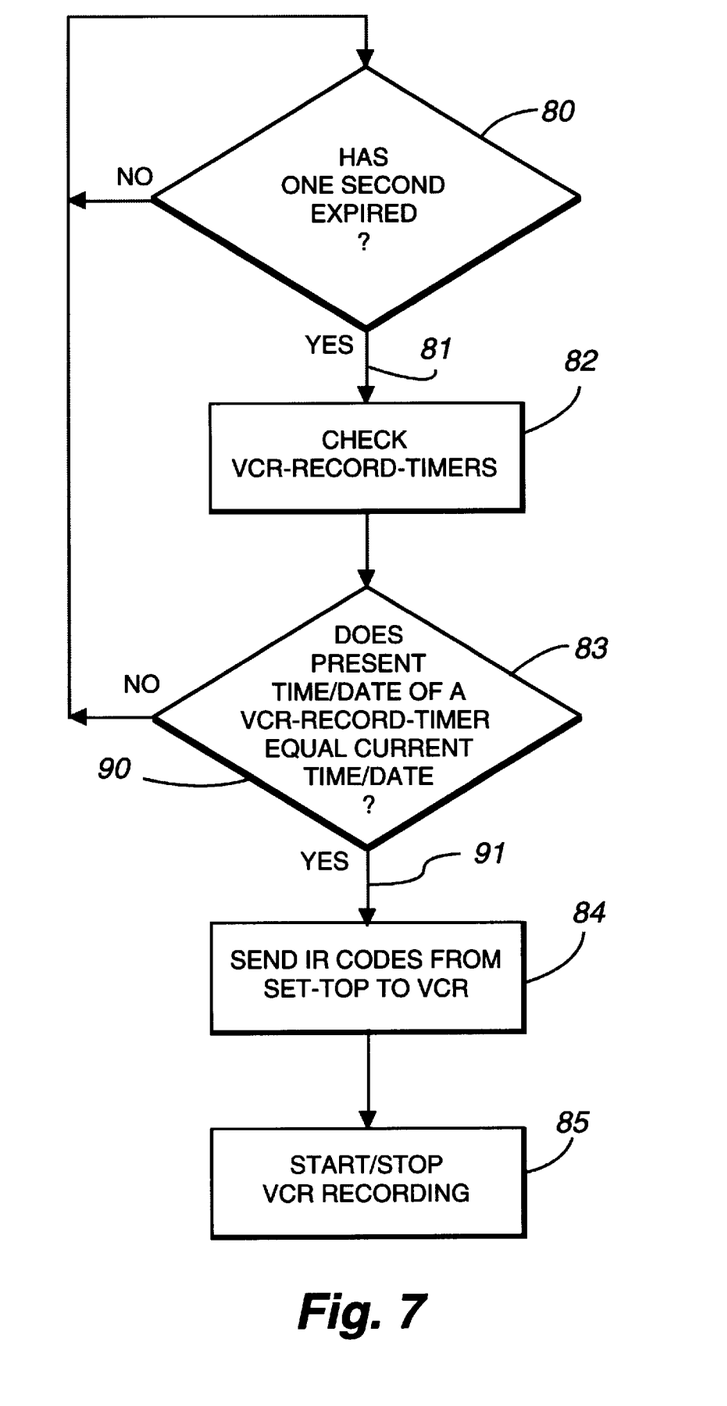
FIG. 7 shows the apparatus/logic/programming of each set-top that enables the set-top to control its associated VCR in accordance with a VCR-record-request that is stored in one of its eight VCR-record-timers.

FIG. 7 shows the apparatus/logic/programming that is contained within each of the set-tops 11 of FIG. 2, which apathies/logic/programming enables a particular set-top 11 to control its associated VCR 15 when a VCR-record-request that is stored in one of its eight VCR-record-timers 27 reaches the current time and date.

The process of FIG. 7 is controlled by what is essentially a one-second timer. That is, decision function 80 operates in a cyclic manner to provide a "yes" output 81 at the end of every one-second time period. When event 81 arrives, function 82 is enabled to check the VCR-record-request content of all active VCR-record-timers 27 that are within the associated set-top 11.

Decision function 83 now determines if the current or present time/date is equal to (or perhaps slightly prior to) the time/date that is recorded in an active VCR-record-timer 27. A "no" output 90 from decision function 83 causes the FIG. 7 process to recycle to the beginning, to await the expiration of another one-second time interval. A "yes" output 91 from decision function 83 enables function 84.

At function 84, the associated set-top 11 is enabled to send well-known IR control codes to its associated VCR 15. In this manner, function 85 is enabled to first begin recording the identified program, and to thereafter stop the recording of this program.

The present invention contemplates the necessity to resolve time-slot VCR recording conflicts that may occur, either when originally manually programming a set-top's VCR-record-timers 27, or later when it becomes necessary to automatically reprogram an active VCR-record-timer 27 as a result of newly received IPG data 51 that causes the timer to contain now-inaccurate recording data.

One conflict that the present invention resolves is a conflict that exists between (1) a future-time and now-incorrect VCR recording request that is stored within an active VCR-record-timer 27 within a set-top 11, and (2) correct IPG-data 51 that is currently stored within the set-top 11. This particular conflict is resolved by (1) automatically rescheduled the related VCR-record-timer 27 to the correct date/time/channel, as this correct date/time/channel is defined within new IPG-data 51 that was transmitted by headend 12 for storage within the set-top 11 at a time after the time at which the related VCR-record-timer 27 was originally programmed by the user.

When it is determined that a VCR-record-timer 27 contains invalid or incorrect IPG data, but the set-top's stored IPG data does not contain an IPG data item that can be used to reprogram the related VCR-record-timer 27, then the set-top's stored IPG data is periodically monitored to determine if any new IPG data is later received from headend 12 that contains the correct IPG data that will enable automatic rescheduling of the VCR-record-timer 27. Note that in this case, the correct IPG data must become available prior to arrival of the incorrect date/time that is stored in the related VCR-record-timer 27. When the correct IPG data does not become available as this date/time arrives, the related VCR-record-timer 27 is cleared or cancelled.

When it is determined that a VCR-record-timer 27 contains invalid or incorrect IPG data, and it is also determined that the set-top's stored IPG data does in fact contain an IPG data item that can be used to reprogram the related VCR-record-timer 27, then all active VCR-recorders 27 of the set-top are interrogated to determine if a time-slot conflict will result from reprogramming the related VCR-record-timer 27. When a conflict would not result, the related VCR-record-timer 27 is reprogrammed to provide the desired future-time recording event. When a conflict would result, a number of means may be utilized to resolve the conflict.

The present invention contemplates resolution of such a conflict that may occur when automatic correction of a VCR-record-timer 27 in accordance with this invention produces a time-slot conflict with an already programmed VCR-record-timer 27. Resolution of this type of conflict was described relative to FIGS. 3 and 6.

Figure 8:
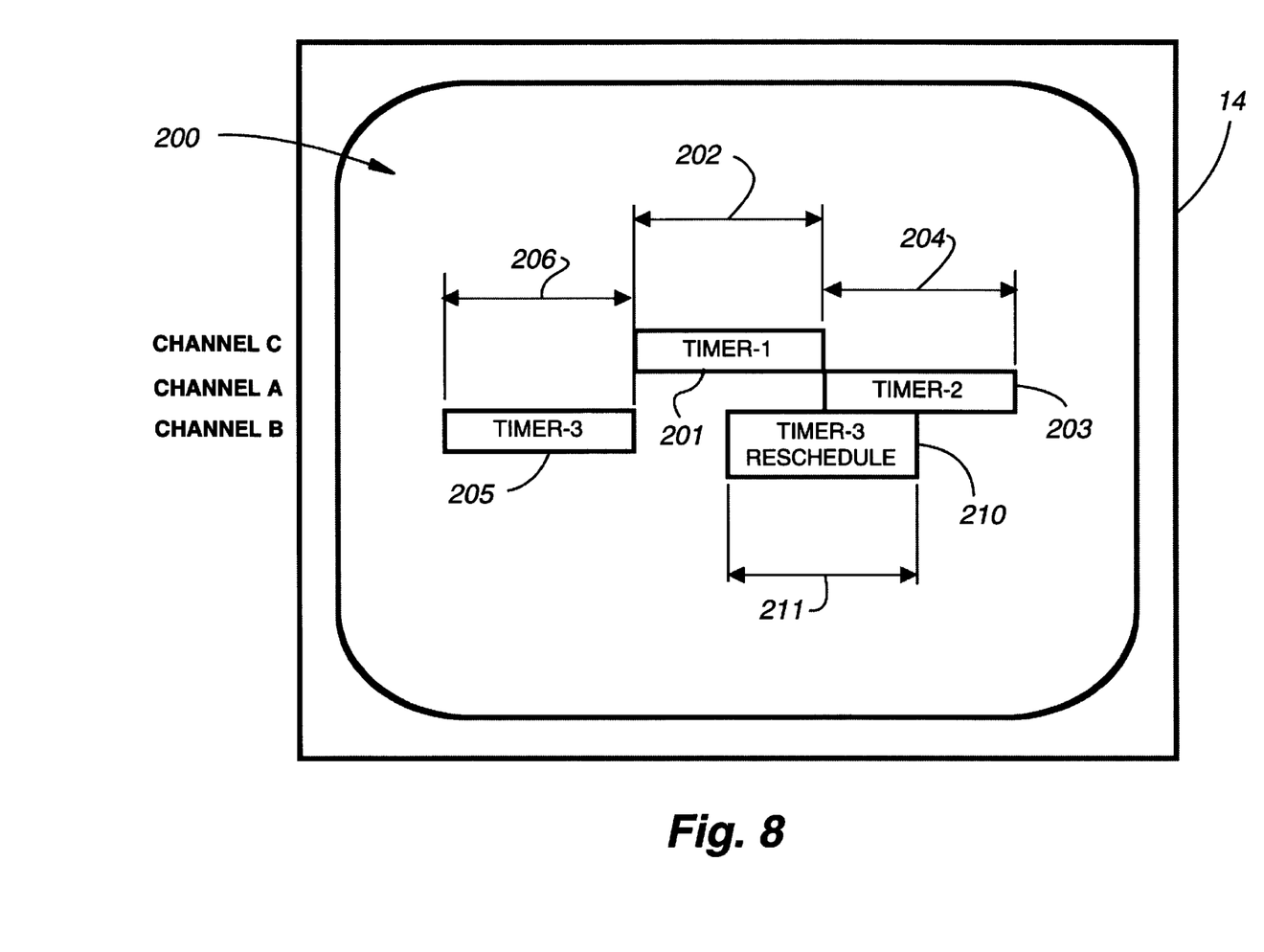
FIG. 8 shows a user-alert graphic message that visually appears on the screen of a user's TV to visually show the user how reprogramming one active VCR-record-timer to its correct time-slot will produce a time-slot conflict with two other active VCR-record-timers.

FIG. 8 shows a user-alert message 200 that visually appears on the screen of a user's TV 14. In this example the set-top's VCR-record-timer-1 was set to record as indicated at 201, i.e. channel A during time-slot 202, the set-top's VCR-record-timer-2 was set to record as indicated at 203, i.e. channel B during time-slot 204, and VCR-record-timer-3 was set to record as indicated at 205, i.e. channel C during time-slot 206. As can be seen from FIG. 8, no conflict exists between the three VCR-record-request events 201,203,205.

Now assume that in accordance with the present invention, for example by operation of decision function 71 of FIG. 6, a conflict is detected as an attempt is made to automatically update VCR-record-request 205 to its correct channel and time-slot 210. In this case, the new and correct VCR-record-time corresponding to recording event 205 is visually displayed to the viewer as shown at 210, i.e. channel C during time-slot 211.

It is within the spirit and scope of this invention that the FIG. 8 times-lot conflict is not automatically resolved, as was described relative to functions 75,76 of FIG. 6 wherein the time-slot conflict between record events 201,203 and 210 are automatically resolved in accordance with this invention, for example by canceling the now-incorrect record request 205, by ignoring the IPG data content of record request 210, and providing a user-alert message, as was described relative to FIG. 6.

In the alternative, the invention does not cancel any of the record requests 201,203,205, but rather provides the user-alert-message or TV display 200, as shown in FIG. 8. This message 200 enables the user to interactively resolve the visually displayed time-slot conflict in accordance with the user's viewing priorities.

For example, the user-alert-message of FIG. 8 comprises a TV display 200 that graphically shows at 201.203,205 the content of three VCR-records-timers 27, along with a similar display 210 of a VCR-record-timer, which, if reprogrammed in accordance with the correct IPG data, would result in a time-slot conflict with the two other record events 201,203. In this way, the user is enabled to interactively use a TV screen cursor to change the conflicting VCR-record-requests as desired. In any event, now-incorrect record request 205 is always cancelled.

More specifically, the user is visually shown (1) that recording event 205 is no longer correct, (2) that the correct and substitute recording event is 211, and (3) that event 211 cannot be used due to a time-slot conflict with both recording event 201 and recording event 203. In this way, the user can manually and interactively reprogram or cancel the related VCR-record-timers 27 in order to satisfy the user's particular recording priorities.

Another conflict that may occur is when the user's TV 14 is currently turned on, i.e. the user is currently watching a TV program. When the record-start-time that is stored within an active VCR-record-timer 27 of the associated set-top 11 is about five, or perhaps ten, minutes prior to the current-time, mixer 31 of FIG. 2 is used to sent a user-alert message that overlies only a portion of the TV picture currently being watched by the user.

For example, when a VCR-record-timer 27 stores the VCR-record-request "2701, Roseanne, channel 5, 8 to 9 PM", at about 7:50 PM of that day, a less-than-full-screen user alert message is automatically sent to the user. This message is sent by way of FIG. 2's frame buffer 29 and mixer 31 and the screen of the associated TV 14.

This alert message enables the user to cancel this particular VCR-record-request, or if the user desires an alternate end result, the user's TV viewing program will automatically change to "Roseanne, channel 5" when the time 8 PM arrives, and the associated VCR 15 will be controlled by operation of FIG. 7 to begin recording the prior-time requested program "2701, Roseanne, channel 5, 8 to 9 PM".

As will be appreciated, the above described operation of the present invention to alert a user that the user's current viewing of the user's TV 14 will be automatically interrupted by a VCR-record-request, comprises a modification of FIG. 7. More specifically, a decision function is provided to detect (1) when the current time precedes the VCR-record-time by ten minutes, and (2) when the user is viewing a channel that is not the channel contained in the soon to be executed VCR-record-request. When these two conditions are detected, the above described user-alert message is sent to the user's TV screen prior to operation of functions 84,85 of FIG. 7.

Figure 9A:
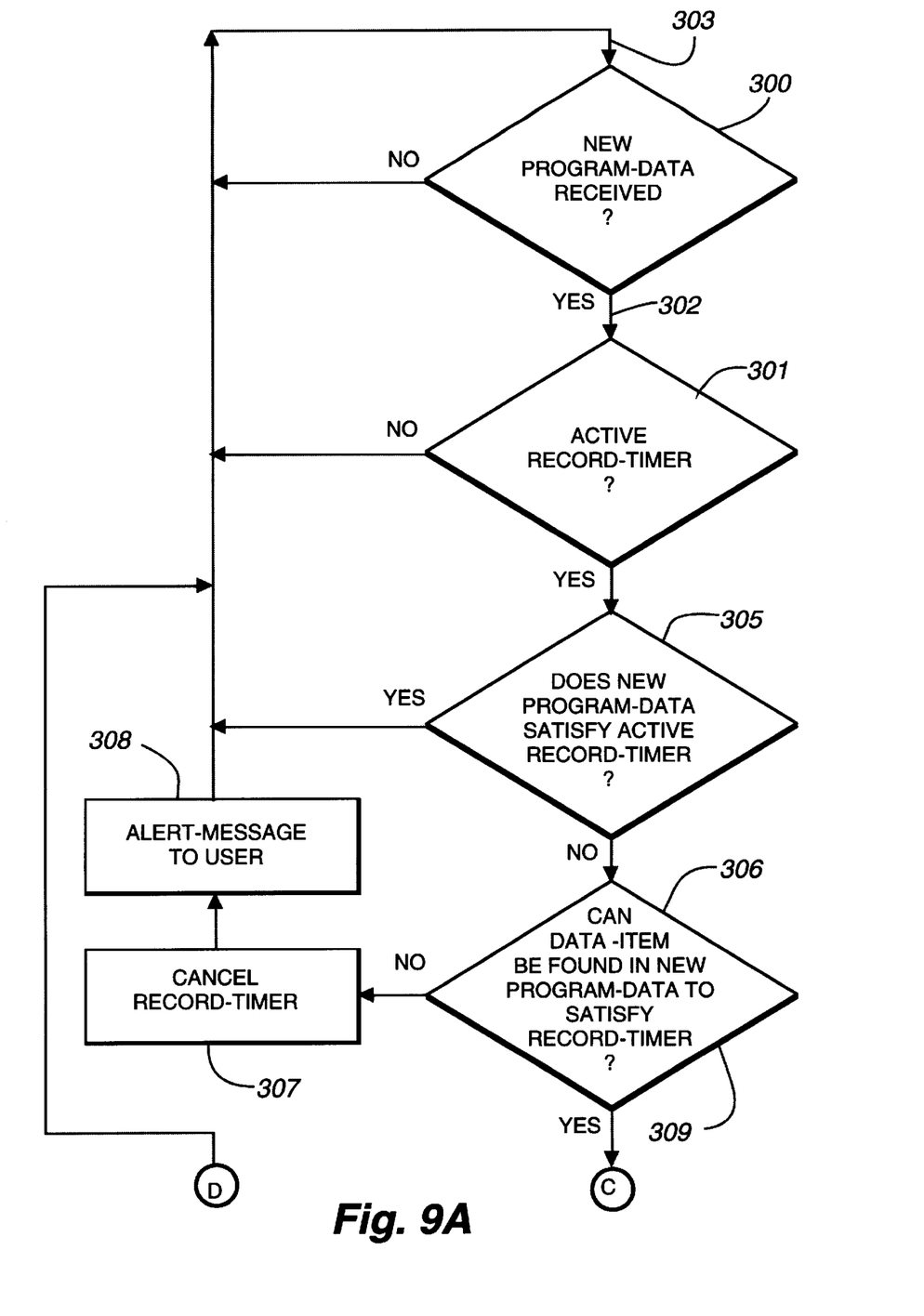
FIG. 9 shows the apparatus/logic/programming of another embodiment of the invention that is contained within the set-top of FIG. 2.
Figure 9B:
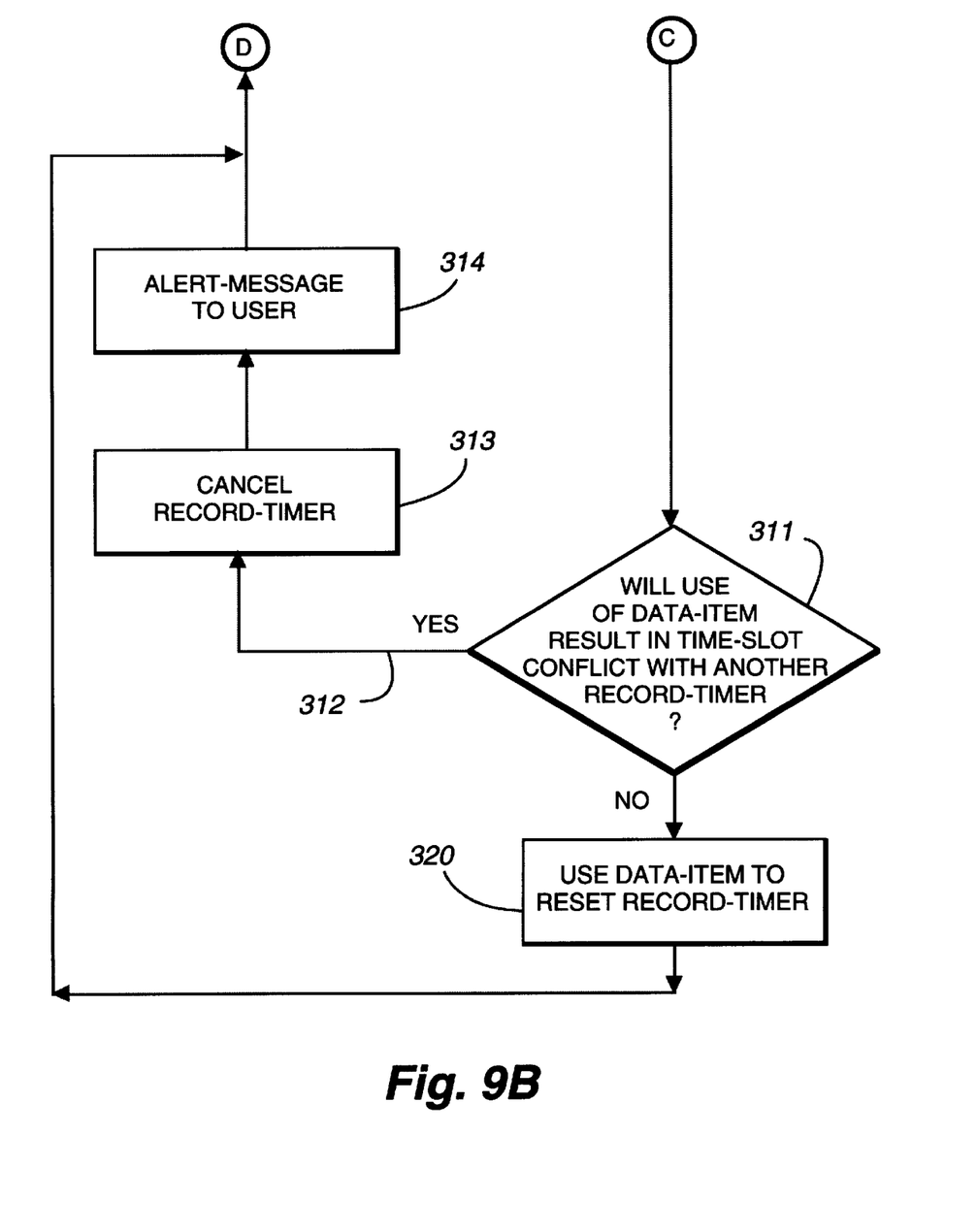

FIG. 9 shows the apparatus/logic/programming of another embodiment of the invention that is contained within set-top 11 shown in FIG. 2. Again, the apparatus/logic/programming of FIG. 9 may be implemented by the use of discrete logic elements, or it may be implemented by programming the operation of CPU 25.

Decision function/apparatus 300 first makes a determination as to whether or not new-program-data has been received by set-top 11 from headend 12, for example by the use of FIG. 4's IPG flag 50. Until such new-program-data is received, the apparatus/logic/programming of FIG. 9 recycles on decision function 300.

When new-program-data is received, decision function/apparatus 301 determines if the set-top 11 contains an active-record-timer 27> The term active-record-timer is defined as a record-timer 27 that was programmed to record a given TV program at a given time, date,channel, wherein this programming took place at a time that is earlier than the occurrence of "yes" output 302 from decision function/apparatus 300. An inactive-record-timer 27 is a timer that is not in use, but is available for the recording of yet another TV program.

When it is determined that no active-record-timers 27 exists, the FIG. 9 apparatus/logic/programming returns to input 303 of decision function/apparatus 300.

When it is determined that active-record-timers 27 do in fact exist, decision function/apparatus 305 is enabled to determine if a data-item that is within the new-program-data will satisfy the active-record-timer 27. That is, does this data-item identify the same given program, time, date, channel? When this condition is detected, there is no need to change the active-records-timer 27, and the FIG. 9 apparatus/logic/programming again returns to input 303 of decision function/apparatus 300.

When it is determined that the new-program-data does not contain a data-item that is identical to the program data that is stored in the record-timer 27, it becomes necessary to enable decision function 306 to determine if a data-item can be found in the new-program-data that identifies the same program at a different time, and/or date, and/or channel.

If such a data-item cannot be found, then function/apparatus 307 and function/apparatus 307 are enabled to cancel the record-timer 27, thereby rendering that particular record-timer inactive, and to provide a user-alert message to the set-top user indicating the details of the record request that has been cancelled by operation of function/apparatus 308. Again, the FIG. 9 process returns to decision function/apparatus 300.

When such a data-item is found, as is indicated by "yes" output 309 of decision function/apparatus 306, then decision function/apparatus 311 is enabled to determine if use of this data-item will result in a time-slot recording conflict with any other active-record-timer within the set-top.

A "yes" output 312 from decision function/apparatus 311 results in enabling function/apparatus 313 to cancel the record-timer, and enables function/apparatus 314 to provide a related user-alert message, much as was done at 307,308. The process now returns to decision function/apparatus 300.

When no time-slot conflict will result from use of this data-item, then function/apparatus 320 is enabled to reset or reprogram the related records-timer 27 to record the same given program, but at a new time, and/or date, and/or channel. Again, the process returns to decision function/apparatus 300.

The present invention has been described in detail while making reference to preferred embodiments of the invention. It will be appreciated that those skilled in the related art will, upon learning of this invention, readily visualize yet other embodiments that are within the spirit and scope of this invention. Thus, the forgoing detailed description is not to be taken as a limitation on the spirit and scope of this invention.

What is claimed is:

1. In a cable TV system wherein program data contains a plurality of program identifiers to identify TV programs that are to be transmitted during a future time interval, wherein said program data is periodically sent to a plurality of set-tops that are within the cable TV system, and wherein most recent received new program data is stored at said set-tops for future use in selectively activating one or more record timers to record one or more TV programs by operation of said one or more active record timers, apparatus for automatically correcting stored program data in said active record timers, comprising;

interrogating apparatus operable to detect when new program data is received by a set-top that contains a first active record timer having stored program data therein identifying a given TV program;

comparing apparatus operable to compare said new program data with said stored program data in order to determine whether or not said new program data contains said stored program data;

searching apparatus responsive to said comparing apparatus determining that said new program data does not contain said stored program data;

said searching apparatus operating to search said new program data to determine whether or not said new program data contains a program identifier that identifies said given TV program;

correcting apparatus responsive to said searching apparatus finding a program data item having a program identifier that identifies said given TV program;

said correcting apparatus operating to replace said stored program data in said first active record timer with said found program data item;

cancellation apparatus responsive to said searching apparatus being unable to find a program identifier that identifies said given TV program;

said cancellation apparatus operating to cancel said stored program data within said first active record timer;

message generating apparatus responsive to said cancellation apparatus operating to cancel said stored program data within said first active record timer;

said message generating apparatus operating to provide a user-alert message relating to said cancellation of said stored program data within said first active record timer:

a second active record timer within said set-top;

conflict determining apparatus responsive to said correcting apparatus replacing said stored program data in said first active record timer with said found program data item;

said conflict determining apparatus operating to compare said found program data item with stored program data within said second active record timer to determine if a time conflict is produced by said found program data item; and     message generating apparatus responsive to said conflict determining apparatus determining that a time conflict would be produced by said found program data item and providing a user alert message relating to said time conflict.

2. In a multiple set-top TV system wherein a program schedule contains a plurality of program items that uniquely identify a like plurality of TV programs that are scheduled for transmission to said set-tops during a future time period, wherein said program schedule is periodically sent to said set-tops for storage thereat as new program data, and wherein a set-top user may select a program item for storage within an active record timer of a set-top, thereby causing said active record timer to effect a future time recording of a TV program that is identified by said program item;

apparatus for automatically correcting program items stored in active record timers of a set-top, said apparatus comprising:
  interrogating apparatus operable to detect when new program data is received by said set-top;
  comparing apparatus responsive to said interrogating apparatus determining that new program data has been received by said set-top;
  said comparing apparatus operating to compare said new program data with program items stored in active record timers of said set-top;
  said comparing apparatus operating to determine whether or not said new program data contains program items that are identical to said program items stored in said active record timers;
  searching apparatus responsive to said comparing apparatus determining that a first active record timer stores a program item that is not identical to any program item contained in said new program data;
  said searching apparatus operating to search said new program data to determine whether or not said new program data contains a program item that is generally identical to said program item stored in said first active record timer;
  correcting apparatus responsive to said searching apparatus finding that said new program data contains a program item that is generally identical to said program item stored in said first active record timer;
  said correcting apparatus operating to replace said program item stored in said first active record timer with said generally identical program item;
  cancellation apparatus responsive to a second active record timer storing a program item that is neither identical or generally identical to any program item in said new program data;
  said cancellation apparatus operating to cancel a program item stored within said second active record timer, thereby causing said second active record timer to become an inactive record timer;
  message generating apparatus responsive to said cancellation apparatus operating to cancel said program item stored within said second active record timer;
  said message generating apparatus operating to provide a user-alert message relating to said second record timer
  a third active record timer;
  conflict determining apparatus responsive to said correcting apparatus replacing said stored program item in said first active record timer with said generally identical program item;
  said conflict determining apparatus operating to compare said generally identical program item with a program item stored within said third active record timer to determine if a conflict is produced by use of said generally identical program item, and
message generating apparatus responsive to said conflict determining apparatus determining that a conflict will be produced by use of said generally identical program item;
said message generating apparatus operating to provide a user alert message relating to said time slot conflict.

3. The apparatus of claim 2 wherein said set-top includes:
  message generating apparatus responsive to said comparing apparatus determining that a given active record timer stores a program item that is neither identical to nor generally identical to any program item contained in said new program data; and
  said message generating apparatus operating to provide a user-alert message relating to said given active record timer.

4. A TV set-top having an input that is adapted to receive TV programs that are transmitted on a plurality of channels, and to periodically receive a program schedule that contains a plurality of individual data items, one data item for each of said TV programs, wherein each data item contains a unique identifier of a TV program, a channel over which said identified TV program is scheduled to be transmitted to said set-top, and a time slot during which said identified TV program is scheduled to be transmitted to said set-top, said set-top having a first output adapted to be connected to a TV set, said set-top having a second output adapted to be connected to a recorder, and said set-top having logic apparatus facilitating user programming of said set-top to supply TV programs to said recorder at future times, said logic apparatus comprising:
  storage logic including a memory for storing said program schedule;
  a plurality of record timers, each of said record timers being adapted to store one data item from said stored program schedule;
  control logic operable by said user to select one data item from said stored program schedule for storage in one inactive record timer in which a data item is not currently stored, said inactive record timer thereafter becoming an active record timer;
  update logic responsive to storage of a later-received program schedule in said memory;
  compare logic controlled by said update logic in response to said storage of said later received program schedule;
  said compare logic operating to compare data items then stored in active record timers to data items in said later received program schedule to,
    (1) determine when a given data item stored in a given active record timer is identical to a data item in said later received program schedule, and when it is determined that said given data item is not identical to any data item in said later-received program schedule, then to
    (2) determine if said given data item identifies a TV program that is generally similar to a data item in said later-received program schedule,
  cancellation logic responsive to said compare logic determining that said given data item is neither identical to a data item in said later received program schedule or generally similar to any data item in said later received program schedule;
  said cancellation logic being operable to cancel said given data item stored in said given active record timer, thereby rendering said given active record timer an inactive record timer;
  replacement logic responsive to said compare logic determining that said given data item is identical to a data item in said later received program schedule, or that said given data item is generally similar to a data item in said later received program schedule;
  said replacement logic operating to replace said given data item stored in said given active record timer with said data item;

recorder activating logic controlled by said given active record timer operable to supply a TV program to said second set-top output in accordance with a TV program, a TV channel, and a time slot identified by said data item; and first message generating logic responsive to said cancellation logic, and operable to generate a visual recording cancellation message on a TV set connected to said first set-top output;

second message generating logic responsive to said replacement logic, and operable to generate a visual recording replacement message on a TV set connected to said first set-top output:

determining logic responsive to said replacement logic operating to replace said given data item stored in said given active record timer with said data item;

said conflict determining logic operating to compare said data item with data items stored in all other active record timers in order to determine if usage of said data item will produce a recording conflict with any data items stored in said all other active record timers; and conflict message generating logic responsive to said conflict determining logic finding that usage of said data item will produce a recording conflict, and operable to generate a visual conflict message on a TV set connected to said first set-top output.

5. A method for updating active record timers within a set-top when a multiple data item program update schedule is received by the set top, comprising the steps of:

sensing when said program update schedule is received;

determining if said received program update schedule contains data items that are identical to data items contained in said active record timers;

when it is determined that said received program update schedule contains data items that are identical to data items contained in said active record timers, and ending said method;

when it is determined that said received program update schedule does not contain a data item that is identical to a data item that is contained in at least one active record timer, determining if said program update schedule contains a data item that is generally the same as said data item contained in said at least one active record timer;

when it is determined that said received program update schedule contains a data item that is generally the same as said data item contained in said at least one active record timer, replacing said data item contained in said at least one active record timer with said generally the same data item, and ending said method;

when said data item contained in said at least one active record timer is replaced with said generally the same data item, comparing said generally the same data item with data items contained in all other active record timers to determine if a recording conflict will result from use of said generally the same data item; and when it is determined that a recording conflict will result, canceling said data item contained in said at least one active record timer, and ending said method; and when it is determined that said received program update schedule does not contain a data item that is generally the same as said data item contained in said at least one active record timer, canceling said data item contained in said at least one active record timer, and ending said method wherein said step of canceling said data item contained in said at least one active record timer includes the step of generating a cancellation message to a user of said set-top.

6. The method of claim 5 wherein said cancellation message is presented to a TV output of said set-top utilizing a frame buffer.

* * * * *